June 2, 1970 J. KENYON ET AL 3,514,928
BEAN HARVESTING MACHINES
Filed April 3, 1967 3 Sheets-Sheet 1

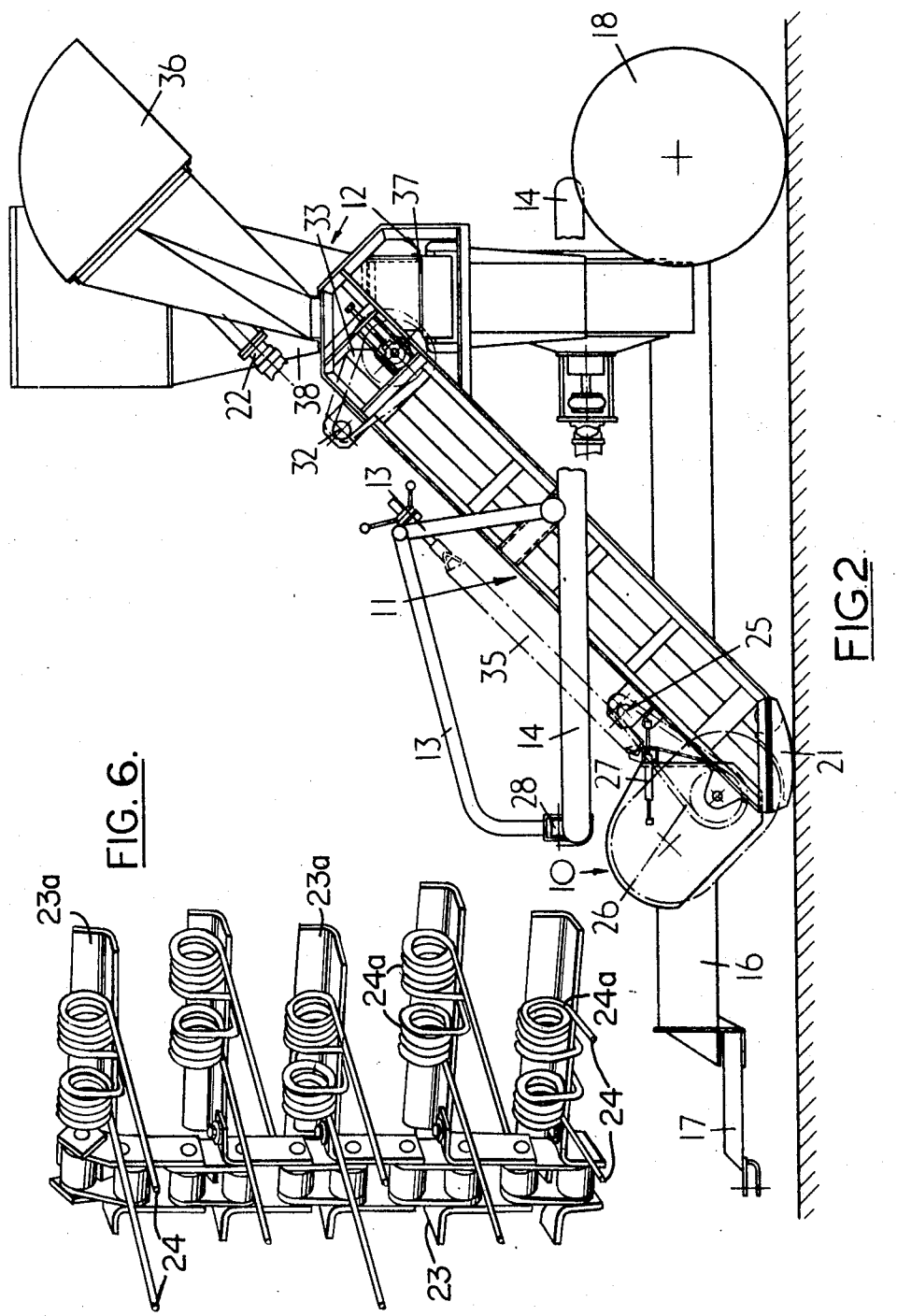

United States Patent Office 3,514,928
Patented June 2, 1970

3,514,928
BEAN HARVESTING MACHINES
Jack Kenyon, Bolton, and Richard Lees Fletcher, Harwood, near Bolton, England, assignors to Mather & Platt Limited, Manchester, Lancashire, England, a British company
Filed Apr. 3, 1967, Ser. No. 628,049
Claims priority, application Great Britain, Apr. 26, 1966, 18,162/66
Int. Cl. A01d 45/22
U.S. Cl. 56—19       12 Claims

ABSTRACT OF THE DISCLOSURE

A bean harvesting machine having at its front a picking reel which is mounted on the machine so that its position relative to the direction of travel of the machine can be varied from one in which it is at right angles to said direction and to one in which it forms an acute angle to said direction to vary the number of rows of beans being picked.

FIELD OF THE INVENTION

This invention relates to bean harvesting machines of the kind having a picking reel which takes the beans and leaves from the stalks as the machine progresses through the crop.

DESCRIPTION OF THE PRIOR ART

Until recently beans have been sown in rows at least 16 inches apart due to the construction of conventional bean harvesters in which the picking reels are disposed with their axes parallel to the plant rows and to the direction of movement of the machines along the bean rows.

It is now considered desirable to close plant rows of beans. By the expression "close planting" we mean beans sown in rows approximately 4 inches apart, or scatter sown. With such close planted beans it is possible to obtain a yield of two to three times the growth per acre than has been possible hitherto.

However, such close planted beans cannot be harvested by conventional bean harvesters due to the disposition of the picking reels which allows only a single row of beans to be picked up or combed at a time.

It is therefore an object of the present invention to provide a bean harvesting machine which can be employed to harvest close planted beans.

SUMMARY OF THE INVENTION

According to the present invention there is provided a bean harvesting machine comprising a picking reel disposed at the front of the machine and adjustable between a position wherein the axis of the picking reel is normal to the direction of travel of the machine and a position wherein the axis of the picking reel is at a predetermined acute angle to the direction of travel of the machine.

As a result of the present invention the picking reel enters the bean crop and picks up or combs a plurality of rows simultaneously.

BRIEF DESCRIPTION OF THE DRAWINGS

An embodiment of the present invention will now be described by way of example with reference to the accompanying drawings, in which:

FIG. 2 is a side elevation of a bean harvesting machine incorporating a picking reel as shown in FIG. 1;

FIG. 6 is a detail view of a portion of the picking reel.

DESCRIPTION OF PREFERRED EMBODIMENT

Figure 1:
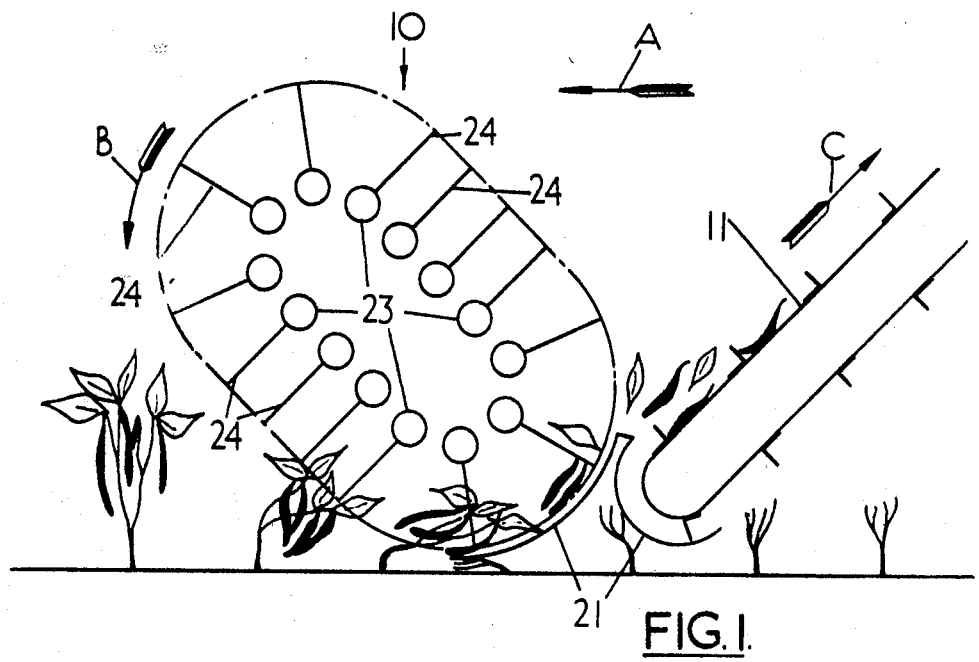
FIG. 1 is a diagrammatic representation of a picking reel in accordance with the present invention.

The bean harvesting machine comprises a picking reel assembly 10 for combing the beans and leaves from the stalks of bean plants as can clearly be seen in FIG. 1, and an elevator assembly 11 for conveying the beans and leaves to a separation and discharge assembly 12. These three assemblies 10, 11 and 12 are supported by a tripod device 13 movable around a tubular ring 14 from a position in which the axis of the picking reel assembly 10 is normal to the direction of travel of the machine to a position in which the axis of the picking reel assembly 10 is disposed at an angle of 15° to the direction of travel of the machine, that is the picking reel assembly 10 is pivotal through 75°.

The tubular ring 14 is connected at one side by tubular struts 15 to a large diameter curved torque tube 16. A drawbar 17 is connected to the front of the torque tube 16 for coupling to a tractor (not shown), and the machine has two rear pneumatically-tyred wheels 18, one of which is rotatably mounted on a curved rearwardly-extending arm 19 secured to the tubular ring 14 while the other is rotatably mounted on a transverse arm 20 secured to the rear of the torque tube 16.

The picking reel assembly 10 is disposed at the front of the machine so that when the machine is used to harvest a bean crop the picking reel assembly 10 leads the machine into the crop in the direction of arrow A and picks up or combs a plurality of rows of beans simultaneously as it rotates in the direction of arrow B.

As can clearly be seen in FIG. 1, the axis of rotation of the picking reel 10 is normal to the direction of movement of the machine, and the reel 10 combs the bean plants downwards and under onto a deadplate 21 associated with the lowest part of the picking reel 10. The beans and leaves are removed from the plant stalks during this combining action and are transferred from the deadplate 21 onto the upwardly-inclined elevator 11 and are carried up in the direction of arrow C to the separation and discharge assembly 12 where the beans and leaves are separated by the action of a fan (not shown) driven by a hydraulic motor 22.

The front of the reel 10 is higher than the rear, the reel comprising a pair of transversely-spaced roller chains of endless construction diagrammatically indicated at 23 in FIG. 1 one of which is shown in detail in FIG. 6, interconnected by bars of angle construction 23A on which are fitted tines 24 integral with springs 24A secured to the bars.

The picking reel 10 is driven by a variable speed hydraulic motor 25 via an endless drive 26, and a turnbuckle 27 is provided for adjusting the reel angle of inclination.

The picking reel 10 may alternatively be a drum type reel.

Figure 3:
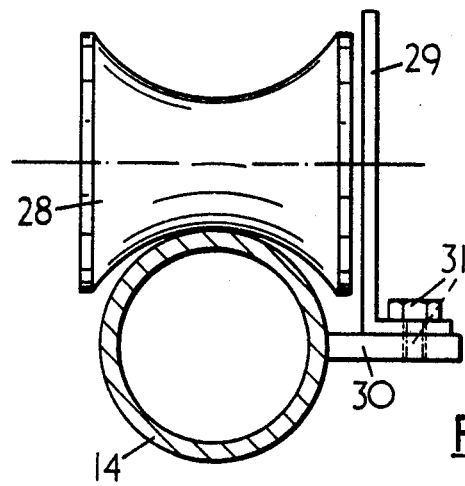
FIG. 3 is a detail view of the picking reel mounting.
Figure 4:
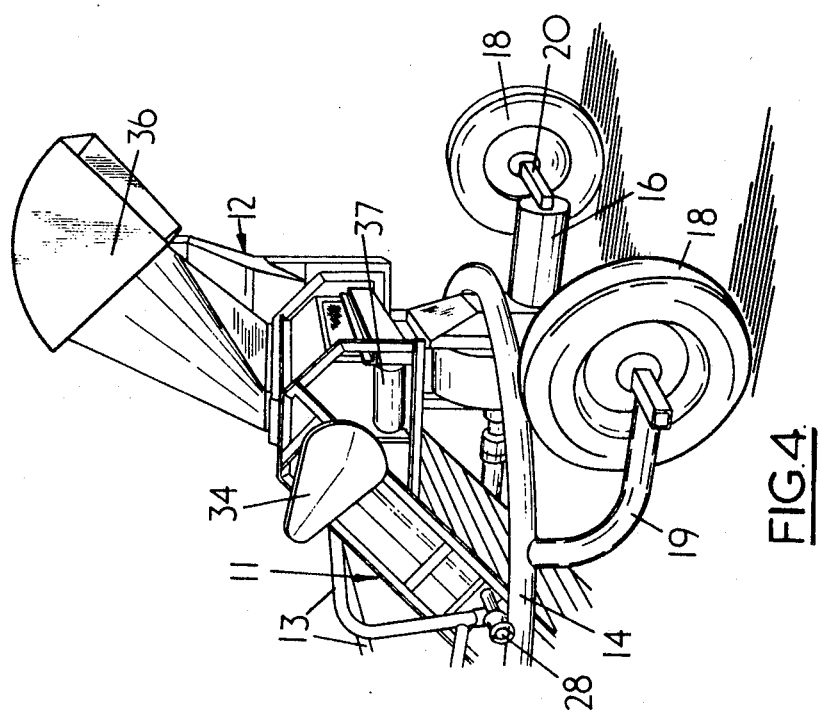
FIGS. 4 and 5 are fragmentary perspective views from opposite sides of the bean harvesting machine.
Figure 5:
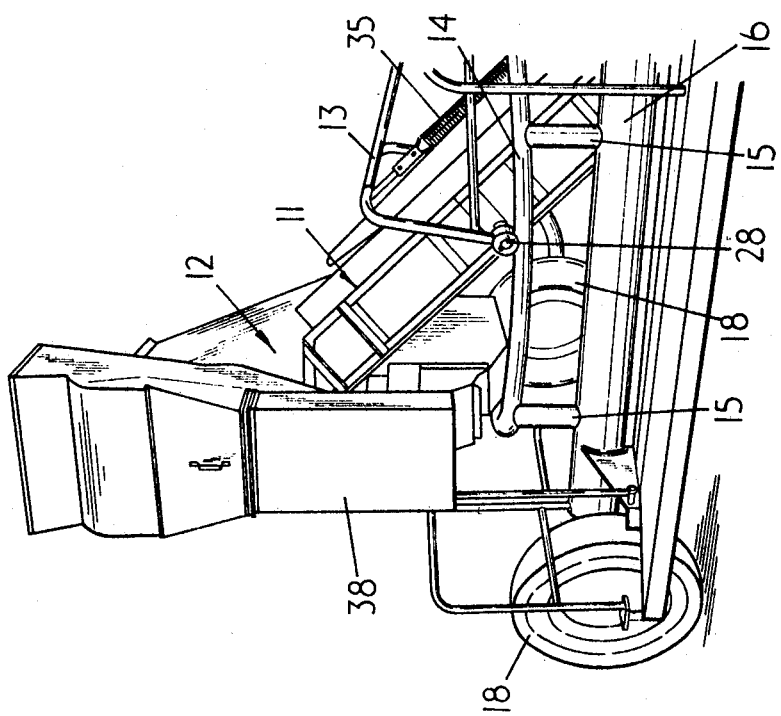

The tripod 13 has three downwardly-extending arms to the bottom of each of which is a roller 28 engaging the tubular ring 14. One of the rollers 28 (see FIG. 3) has an angle bracket 29 connected to it which cooperates with a bar 30 secured to the inside of the ring 14. The bracket 29 has a bolt hole in its horizontal web and the bar 30 is formed with a series of spaced bolt holes, the bracket 29 and bar 30 being secured together by a nut and bolt 31. The bolt holes in the bar 30 are spaced so that the assemblies 10, 11 and 12 can be rotated through 15°, 30°, 45°, 60° and 75° and locked in each of these adjusted positions by the nut and bolt 31. Thus the disposition of the picking reel assembly 10 can be easily and readily adjusted relative to the direction of travel of the machine. It will be manifest that as the angle of disposition of the picking reel relative to the direction of travel of the machine decreases the fewer rows of beans will be combed.

The elevator 11 is driven by a hydraulic motor 32 via an endless drive 33 enclosed in a protective casing 34.

The picking reel and elevator assemblies 10 and 11 are resiliently supported by a spring and screw adjustment device 35.

The torque tube 16 in addition to serving the function of preventing twist of the machine also serves as a reservoir for oil for the various hydraulic motors, delivery of oil being effected via known pumps, valves and suitable flexible piping (all not shown).

The beans and leaves, as aforesaid, are subjected to the action of a separating fan, the leaves passing up discharge duct 36 and the beans falling on to a traversely-moving belt 37 and being conveyed to a bagging unit 38.

The bagging unit 38 may be replaced by a continuous discharge arrangement of known construction or a bulk discharge arrangement of known construction.

What is claimed is:

1. A bean harvesting machine comprising a frame, a picking reel at the front of the machine, a ring mounting secured to said frame, a support carrying said picking reel and cooperatively engaging said ring mounting for movement around said ring mounting about a vertical axis to rotate the picking reel bodily between a position lying transversely to the direction of movement of the machine and a position lying at an acute angle to the direction of movement of the machine.

2. A bean harvesting machine as claimed in claim 1, including complementary securing members carried by said ring mounting and said support, said securing members being connectible together in several positions to lock said picking reel in a preselected disposition, with respect to the direction of movement of the machine.

3. A bean harvesting machine as claimed in claim 1, wherein said support is a tripod having three downwardly-extending arms at the lower end of each of which is mounted a roller for engagement with and rolling around said ring mounting.

4. A bean harvesting machine as claimed in claim 3, in which one of said tripod arms includes a bracket, a bar connected with said ring mounting, said bracket having a bolt-receiving hole and said bar having a plurality of bolt-receiving holes, and bolt means engageable with said bolt-receiving hole in said bracket and one of said bolt-receiving holes in said bar to permit securement of said picking reel in a preselected disposition with respect to the direction of movement of the machine.

5. A bean harvesting machine as claimed in claim 1, in which said picking reel comprises a pair of transversely-spaced endless roller chains, bars of angle construction interconnecting said roller chains, and tines integral with springs secured to said bars.

6. A bean harvesting machine as claimed in claim 1, in which said picking reel is oval and has a front portion and a rear portion with respect to the direction of movement of the machine, said front portion of said picking reel being higher than said rear portion thereof, means connecting said picking reel to said support, said means including a turnbuckle to permit adjusting of the angle of inclination of said picking reel.

7. A bean harvesting machine as claimed in claim 1, in which said picking reel is adjustable through an angle of 75° in equal steps and is securable in adjusted position at each step.

8. A bean harvesting machine as claimed in claim 1, further including an elevator assembly and a separation and discharge assembly, said picking reel delivering beans and leaves onto said elevator assembly which delivers them to said separation and discharge assembly, both such assemblies being disposition adjustable together with said picking reel.

9. A bean harvesting machine as claimed in claim 8, in which said picking reel and said elevator assembly are each driven by a hydraulic motor.

10. A bean harvesting machine as claimed in claim 9, in which there is provided along one side of the machine a relatively large-diameter torque tube, said ring mounting being fixed to said torque tube, and said torque tube further acting as an oil reservoir for said motors.

11. A bean harvesting machine as claimed in claim 8, further comprising a resilient mounting for said picking reel and said elevator assembly.

12. A bean harvesting machine as claimed in claim 1, further comprising a pair of rear ground-engaging wheels and a forwardly-extending drawbar.

References Cited

UNITED STATES PATENTS

| 2,233,253 | 2/1941 | Cory | 56—19 |
| 2,388,454 | 11/1945 | Weeth et al. | 56—33 |
| 3,282,036 | 11/1966 | Paulson et al. | 56—19 |
| 3,408,797 | 11/1968 | Currence | 56—19 |

F. BARRY SHAY, Primary Examiner

J. A. OLIFF, Assistant Examiner

U.S. Cl. X.R.

56—327